United States Patent

Mullett et al.

[11] Patent Number: 4,957,183
[45] Date of Patent: Sep. 18, 1990

[54] 4-WHEEL COORDINATED STEERING MULTI-PURPOSE TRACTOR

[75] Inventors: Paul W. Mullett, Hesston; Elmer D. Voth, Newton, both of Kans.

[73] Assignee: Excel Industries, Inc., Hesston, Kans.

[21] Appl. No.: 360,118

[22] Filed: Jun. 1, 1989

[51] Int. Cl.⁵ .................. A01D 35/26; B60G 11/08; B62D 5/06; B62D 7/16
[52] U.S. Cl. ..................... 180/234; 56/DIG. 22; 180/236; 180/242; 280/91; 280/99; 280/104
[58] Field of Search .......... 180/233, 234, 236, 242; 280/91, 95.1, 99, 104; 56/DIG. 22

[56] References Cited

U.S. PATENT DOCUMENTS

| | | |
|---|---|---|
| 1,126,111 | 1/1915 | Smith .................... 280/91 |
| 3,504,928 | 4/1970 | Reimer ................... 180/234 |
| 3,596,730 | 8/1971 | Cecce .................... 180/236 |
| 4,557,346 | 12/1985 | Guignard et al. ........ 180/242 |
| 4,749,206 | 6/1988 | Delery et al. ........... 280/104 |

Primary Examiner—Mitchell J. Hill
Attorney, Agent, or Firm—Edward L. Brown, Jr.

[57] ABSTRACT

A 4-wheel mobile vehicle including provision for controlling the steering position of each of the four (4) wheels so that every wheel's rolling axis will intersect at a common central point around which the vehicle will turn. The control is provided by a pair of cables which can interconnect each of the pair of wheels on each side of the vehicle to turn through similar turns in the opposite direction, and wherein the linear position of the cables are provided by a pair of specially cut cams which are positioned by the steering column. Each pair of wheels is further characterized by a support system which provides for vertical deviation of the front and back wheels without substantially causing the vehicle carriage itself to be vertically deviated by a substantial amount.

13 Claims, 4 Drawing Sheets

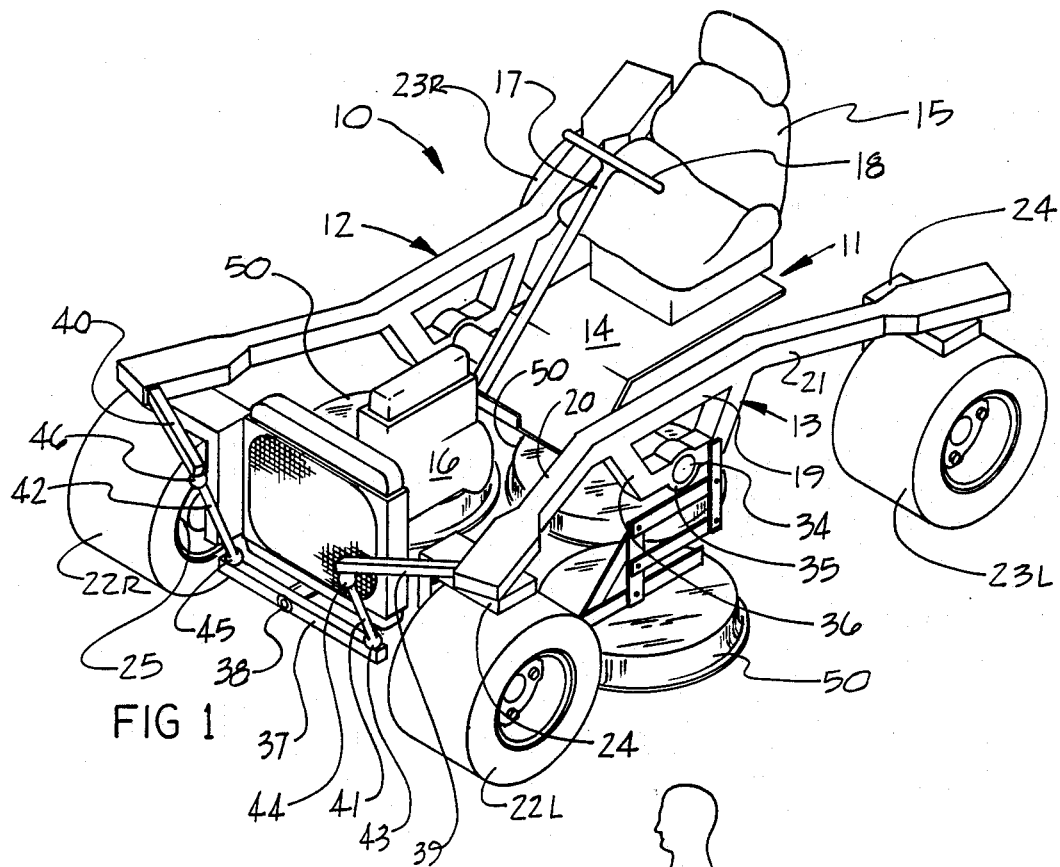
FIG 1
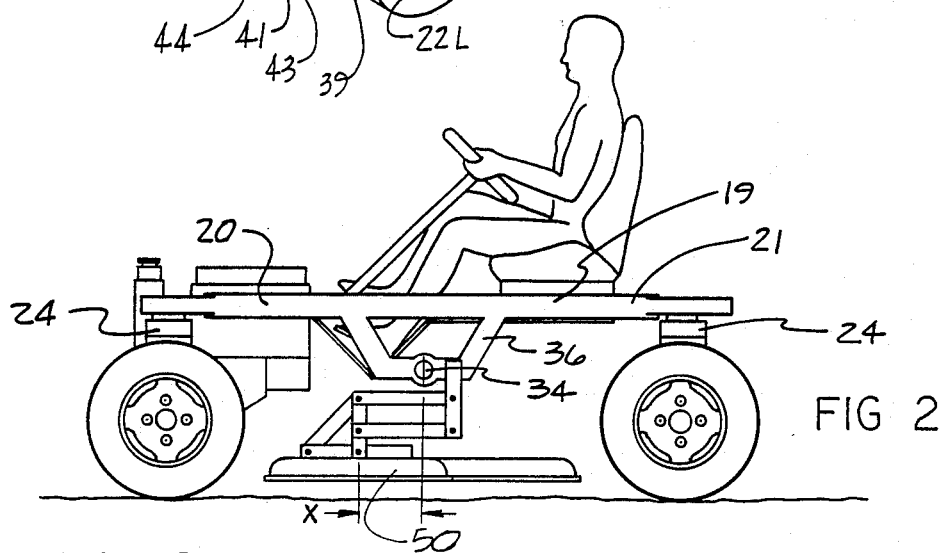
FIG 2
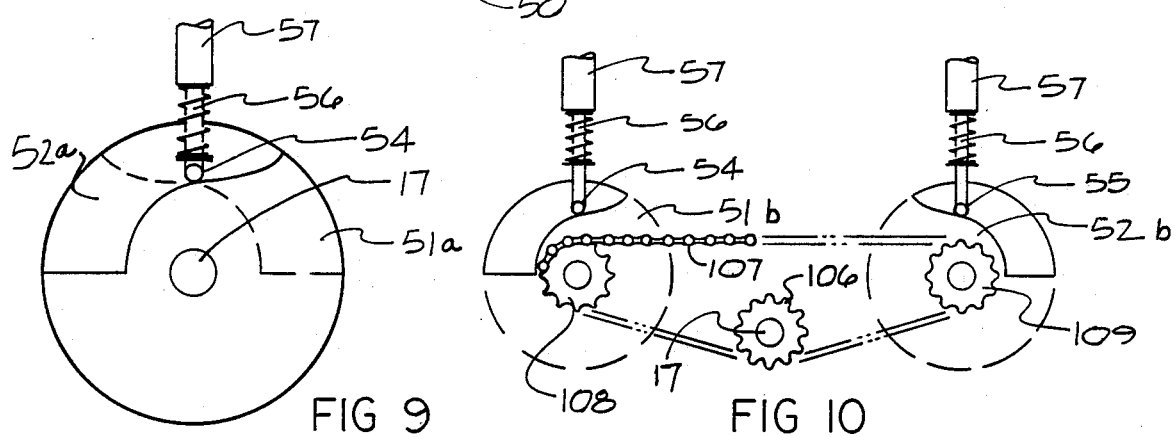
FIG 9
FIG 10

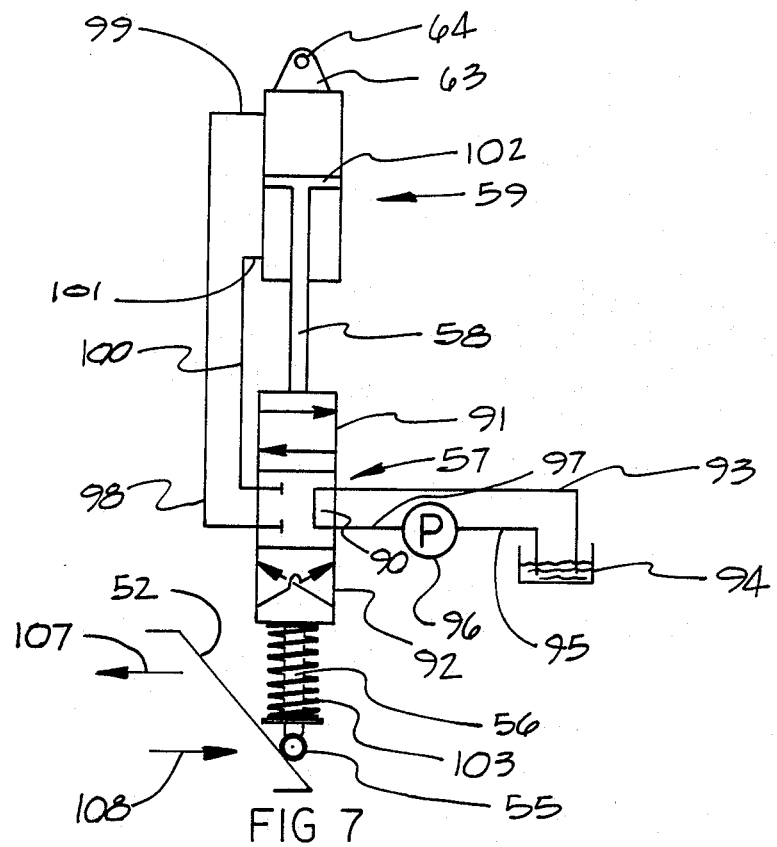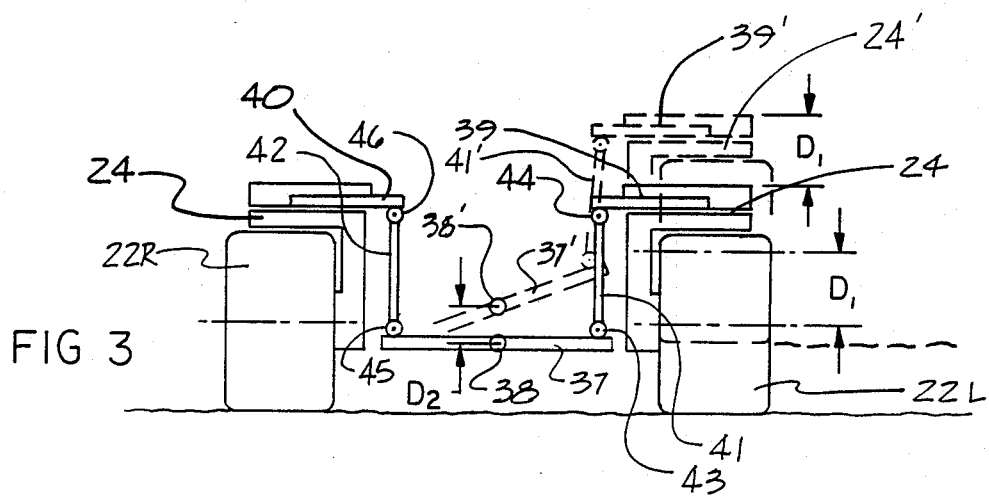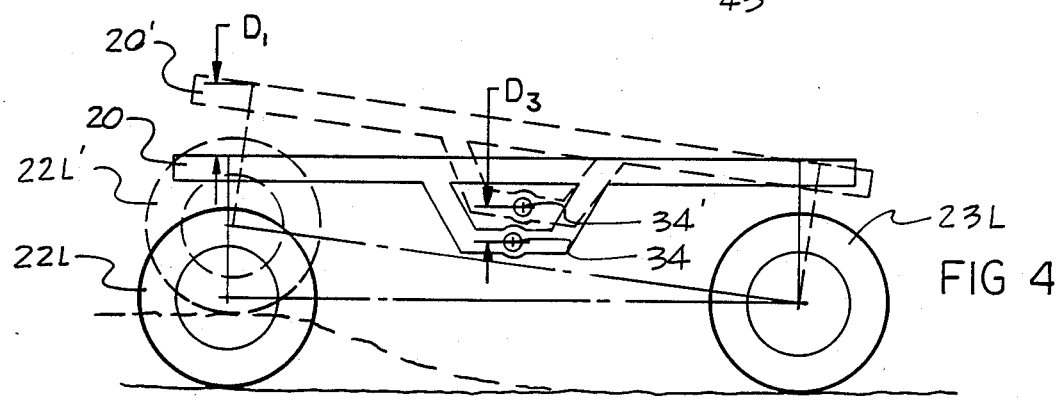

4-WHEEL COORDINATED STEERING MULTI-PURPOSE TRACTOR

BRIEF DESCRIPTION OF THE PRIOR ART

Coordinated 4-wheel vehicle steering is accomplished in several ways. For example, U.S. Pat. No. 4,373,603, issued to Carl D. Nelson, discloses a steering system control means for coordinating the turning movements of the rear wheels in response to the turning movements of the front wheels in a plurality of modes of operation. The patent has a sensing means which feeds an electrical signal to a control box which determines the position of the wheels in response to a selector switch selected by the operator of the vehicle.

U.S. Pat. No. 2,910,131, issued to A. S. Krotz, discloses a steering apparatus for a steered vehicle which utilizes a plurality of hydraulic cylinders and hydraulic controls for positioning the front and back wheels on each side of a vehicle in a desired direction, either longitudinally or about a radius in response to the steering commands of an operator. This patent requires an extremely complex mechanical-hydraulic apparatus in order to accomplish the desired steering for each of the four wheels.

U.S. Pat. No. 3,596,730, issued to Robert F. Cece, is another patent relating to steered vehicles wherein a complex mechanical-hydraulic system is utilized in order to control the position of the front and rear wheels of a vehicle so that it can traverse either a straight or curvilinear path about a common axis of rotation.

U.S. Pat. No. 4,416,109, issued to John J. Slazas, illustrates one method of supporting the four (4) wheels of a vehicle in order to maintain the carriage of the vehicle in a substantially uniform plane while the wheels are deviating vertically about the common plane.

BRIEF DESCRIPTION OF THE INVENTION

All of the above patents relate to an apparatus for moving a carriage over a substantially flat plane while the steering apparatus is turning all of the vehicle wheels so that their rolling axes will all intersect at a common center point of rotation, traversing a linear path, or while some or all of the wheels are deviating vertically from the plane during the period of time one or more the wheels is moving over hills or valleys.

This invention discloses a simple, mechanical means for both maintaining the carriage portion of the vehicle in a substantially uniform plane while the wheels are deviating vertically from the uniform plane. Furthermore, this invention provides for a simple mechanical means for steering the vehicale, either along a linear path or around a common point by providing control over all four (4) wheels so that the path of the wheels will be normal to a radius of each wheel which passes through the common point or axis of rotation.

In one embodiment of the motorized vehicle, a frame means has a first and second side frame, each of which has first and second wheels, each side frame is journaled for rotation about a first axis parallel to a plane through the frame and each wheel is journaled about a second axis perpendicular to the plane. First and second turning means are coupled to the second axis journalling means for rotating the first pair of wheels in opposite directions from each other and the second pair of wheels, likewise, in opposite direction from each other. First and second cams have following which are controlled by a steering means rotatably attached to the frame and communicating with the cams. Means are provided for coupling the first and second cams followers to the first and second turning means, respectively, with the cams being configured in a manner to cause first and second pairs of wheels to follow a first and second circumference, both having a common center, when the steering wheel is turned. The turning means essentially comprises a cable passing over pulleys which are axially attached to each of the journalling means on one side of the carriage in a manner so that linear movement of the cable will cause the pulley journal to one wheel to turn in one direction and will cause the remaining wheel to turn a like number of degrees in the opposite direction.

This invention also features a suspension system for the central frame or body of the vehicle in a manner so that a wheel can deviate vertically without causing a substantial deviation in the central frame of the vehicle which carries the cutting apparatus or other attachments for the vehicle. The suspension system essentially comprises a central frame with right and left side frames pivotally attached thereto, with each side frame supporting a wheel at each end. A bar is pivotally mounted to the front portion of the central frame with its ends each being connected to a side frame though pivot joints and connecting links. The side frames are likewise centrally journalled through a pivot to the central frame of the vehicle so that vertical movement of the wheels will be about the horizontal pivot and about the central frame and ends of the pivoted bar; thus, the wheels can move a substantial amount in a vertical direction without causing a substantial deviation in the vertical positioning of any attachments located under the body of the vehicle. The placement of a cutting apparatus also provides for complete cutting of grass or other material when the vehicle is making a turn about a location such as the edging around a tree or flower garden, for example.

BRIEF DESCRIPTION OF THE FIGURES

FIG. 1 is an isometric projection of the vehicle illustrating the vehicle suspension system which attaches the wheel modules to the central portion of the vehicle;

FIG. 2 is a side view of the apparatus illustrated in FIG. 1;

FIG. 3 is a symbolic front view of the apparatus illustrated in FIG. 1, showing one of the front wheels being displaced;

FIG. 4 is a symbolic side view of the apparatus illustrated in FIG. 3;

FIG. 7 is a hydralic schematic illustrating the valving and cam follower system in cooperation with the novel cam of this invention;

FIGS. 9 and 10 are alternate embodiments of the cam illustrated in FIG. 8.

DETAILED DESCRIPTION OF THE INVENTION SUSPENSION SYSTEM

Figure 5:
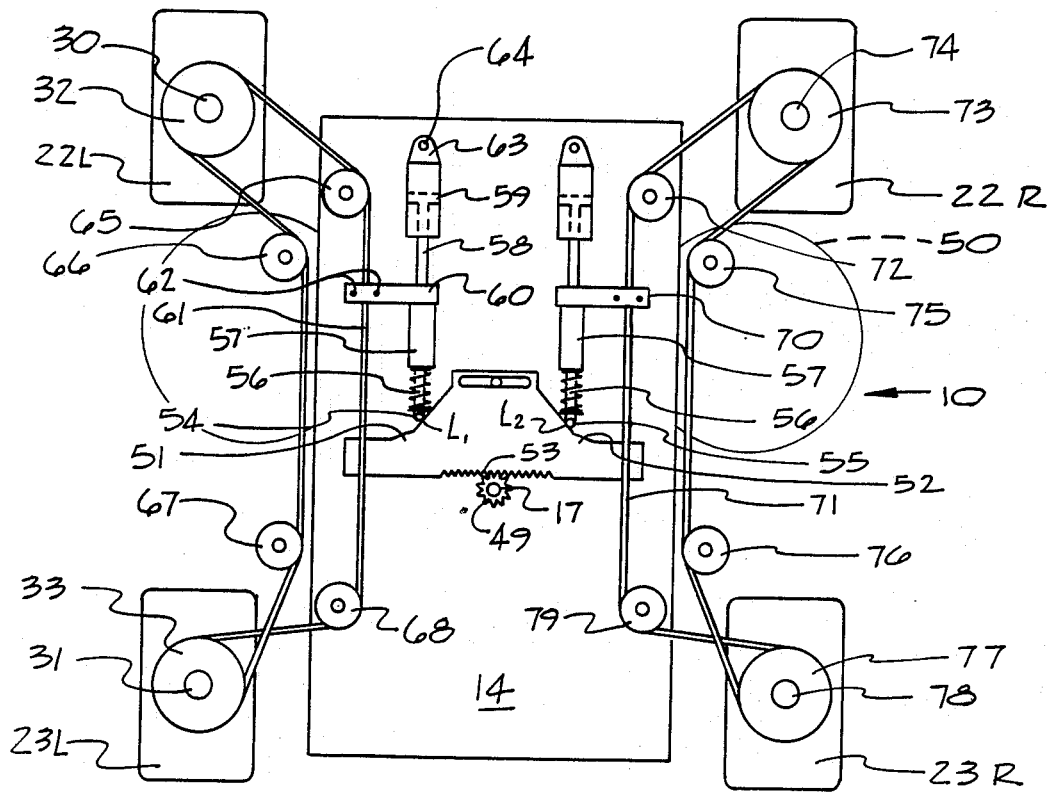
FIG. 5 is a plan view, partially symbolic, showing the control of the wheels using the novel cam and cable configuration.

Referring to all of the drawings but in particular to FIGS. 1, 2, 3 and 4, the novel suspension system for this vehicle is illustrated. A vehicle generally referred to by arrow 10 comprises three separate assemblies, a central frame or body referred to by arrow 11 positioned in a generally horizontal plane, a right-hand side frame 12 and a left-hand side frame 13. Central frame 11 essentially consists of mounting platform 14 having a seat 15 attached thereto at the rear of platform 14 and a motor 16 attached at its front. A steering column 17 is rotatably attached at the mid-portion between motor 16 and seat 15. Steering column 17 has a steering wheel 18 attached at its end for rotating steering column 17 at the desire of an operator.

Each of the right-hand and left-hand side frames 12 and 13, respectively are essentially identical excent mirror images of each other and therefore, only one side frame 13 will be fully described. It essentially consists of a central channel member 19 with fore and aft angular portions 20 and 21 attaced thereto. Each wheel 22L and 23L is rotatably mounted on an "L" shaped bracket 24 (see FIGS. 1 and 3). "L" shaped bracket 24 has an hydraulic motor 25 attached thereto (FIG. 1) for supporting and driving each of wheels 22L, 23L, 22R and 23 R. A pair of wheels 22L and 23L are likewise attached to fore portion 20 and aft portion 21, respectively, by "L" shaped bracket 24 having vertical shafts or journals 30 and 31 (see FIG. 5 or 6) which in turn have pulleys 32 and 33 rigidly attached thereto. Both right-hand side frame 12 and left-hand side frame 13 are attached to central frame 11 through a horizontal shaft 34 which is mounted under platform 14 and extends on each side thereof. Side frame 13 is rotatably journalled in a bearing 35 which is attached to a "U" shaped member 36 about a first axis. Member 36 is welded to central channel member 19.

The second point of attachment for side frames 12 and 13 is provided by a horizontal bar 37 which has a pivot 38 centrally located along bar 37. Pivot 38 is attached to the forward end of platform 14. Bar 37 is supported by extensions 39 and 40 which are each attached to fore portion 20 on the left-hand side frame 13. A tie-rod 41 is pivoted at 44 and 43 to extension 39 and to horizontal bar 37. Tie-rod 42 is pivoted to extension 40 through a pivot 46 and is attached to horizontal rod 37 through a pivot 45.

SUSPENSION SYSTEM OPERATION

The operating of the suspension system can be best illustrated by referring to FIGS. 3 and 4. In these figures a single wheel 22L is shown positioned in a new position 22L' which has been lifted as a consequence of a raise in the surface of the earth by a amount D1. Thus, fore portion 20 has likewise been raised to a position 20'. However, horizontal shaft 34 has only been raised to a new location 34' which is a distance D3. It should be noted that distance D3 is substantially less than distance D1. The second support point represented by pivot 38 has likewise been raised by a distance D2 which is also substantially less than the distance D1. Thus, when wheel 22L is raised to the new position 22L' which is a distance D1, then extension 39 is raised to a new position 39', raising tie-rod 41 to the new position 41'. Since tie-rod 41' is tied to horizontal bar 37 at linkage point 43, horizontal bar 37 will raise to the new position 37; raising pivot point 38 to 38'. As perviously discussed, this distance D2 is substantially less than the distance D1 since both the front of central frame 11 and the side of central frame 11 are raised by a distance D2 and D3, respectively, both of which are substantially less than the distance D1. Any attachment to central frame 11 will likewise be shifted out of its position with the ground by a lessor amount than would ordinarily be expected. Thus, the suspension assembly described causes a substantial reduction in the vertical shift of any attachments connected to the under portion of central frame 11, such as, for example, grass cutting heads 50, as illustrated in FIGS. 1 and 2.

STEERING APPARATUS

Figure 6:
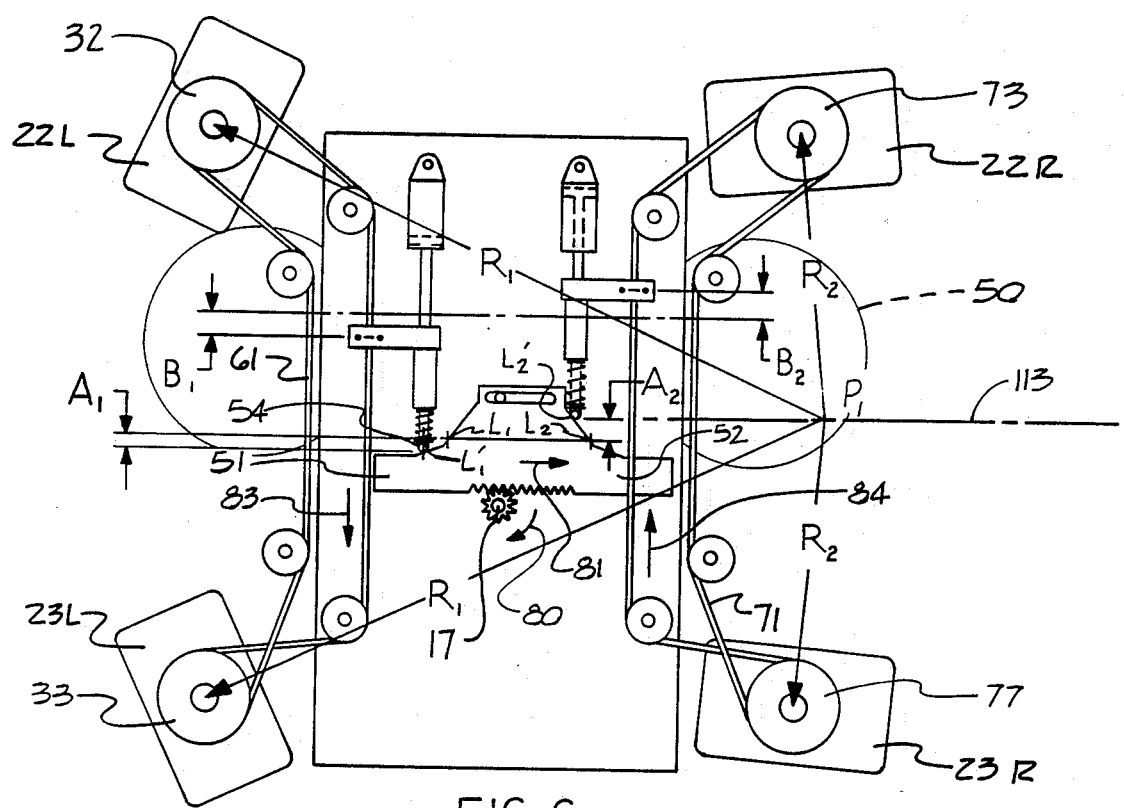
FIG. 6 is a similar plan view of FIG. 5, showing the position of the cam, cables and wheels during a turn about a point P1.

Referring to FIGS. 5 through 9, but in particular to FIGS. 5 and 6, the steering control assembly essentially comprises first and second cams 51 and 52, respectively, which operate the left side wheels and right side wheels, respectively. Cam 51 has a cam follower 54, and cam 52 has a cam follower 55. Joining cams 51 and 52 is a rack gear 53, and a pinion gear 49 attached to steering column 17. Each of cam followers 54 and 55 is attached to a rod 56 which communicates with a spool valve 57 and a piston rod 58 for positioning cylinder 59.

The actual details of operation of the spool valve and positioning cylinder are better illustrated with a description of FIG. 7 which will follow. A clamping apparatus 60 is attached to spool valve 57 and clamped to a cable 61 by means of a plurality of bolts 62. Cylinder 59 is connected to platform 14 through a bracket 63 and bolt 64. Cable 61 travels around an idler pulley 65, around pulley 32, another idler pulley 66, through a third idler pulley 67 and pulley 33, and then around idler pulley 68 to form a complete loop, noting that cable 61 passes around pulley 33 so that pulley 33 turns in the opposite direction from pulley 32. Clamp 70 connects control valve 57 to cable 71 for the right-hand wheels. Cable 71 passes around pulleys 75, 73, 72, 79, 77 and 76 in a like manner as cable 61 just described and turns wheels 22R and 23R together in like angles of rotation but in opposite directions.

DIRECTIONAL CONTROL OPERATION

The directional control will be explained separately from the actual operation of the various power steering cylinders and the hydraulics associated therewith. The directional control operation is best determined by referring to FIGS. 5 and 6.

In FIG. 5, vehicle 10 is positioned for straight ahead steering, that is wheels 22L, 23L, 22R and 23R are oriented so that the rolling axes of the wheels are parallel. Referring to cams 51 and 52, it is noted that cam followers 54 and 55 are located at point L1 and L2, respectively, on cams 51 and 52, respectively. In the event it is desired to rotate the vehicle 10 about a certain location, such as point P1, as seen in FIG. 6, then it is necessary that the rolling axes of all four wheels pass through point P1 (as seen by radii R2, R2, R1, R1). Thus in order for vehicle 10 to traverse about point P1, each pair of wheels 22R and 23R and 22L and 23L must traverse individual circumferences spaced by the distances of radii R1 and R1, respectively. As can be seen in FIG. 6, the wheels 22R and 23R turn through a much greater turning angle than wheels 22L and 23L. In order to accomplish this, pinion gear 49 is rotated by steering shaft 17 in the direction of arrow 80, which will move the rack 53 in the direction of arrow 81. This will cause cam follower 54 to drop down on cam 51 a distance A1, while cam follower 55 will climb on cam 52 a distance A2 to points L'1 and L'2 respectively. Cable 61 has moved in the direction of arrow 83, while cable 71 has moved in the direction of arrow 84. The movemnet of cable 61 in the direction of arrow 83 a distance B1, will cause pulleys 32 and 33 to rotate clockwise and counterclockwise respectively on journals 30 and 31, causing the wheels to rotate to the position illustrated in FIG. 6. Cable 71, on the other hand, will move a distance B2 in the direction of arrow 84, a greater distance causing pulleys 73 and 77 to also rotate clockwise and counterclockwise, respectively on journals 74 and 78, so that wheels 22R and 23R assume a position normal to radius R2. In the event the opposite direction of rotation is desired, rack and pinion gear 49 need only to be turned the opposite direction which will cause the cables to move opposite to that illustrated in FIG. 6.

In order to facilitate the steering of a substnatially heavy mowing machine, the cam followers 54 and 55 are coupled to a conventional power steering circuit which is illustrated in FIG. 7. Cam follower 55 is shown in contact with cam 52 (FIG. 7). Control valve 57 is a three position 4-way valve having a cut-off position 90, a direct flow position 91 and a reverse flow position 93. Hydraulic lines 93 couple the control valve 57 to sump 94 and hydraulic line 95 couples sump 94 to a pump 96 and from pump 96 to a line 97 to control valve 57. Line 98 couples control valve 57 to the cap end 99 of positioning cylinder 59 while line 100 couples control value 57 to the rod end of the cylinder, Pistor 102, which is internal to cylinder 59, is connected to piston rod 58 as illustrated, which is in turn connected to a movable spool in control valve 57. A spring 103 and spring washer 104 apply a bias on rod 56, which in turn supports cam follower 55 and is connected to the movable spool in control valve 57 in a manner to maintain cam follower 55 against the surface of cam 52.

The hydraulic control system of FIG. 7 operates in the following manner. When cam 52 is shifted to the left, as indicated by arrow 107, cam follower 55 moves down cam 52 due to the force of spring 103, causing valve 57 to shift to its position 91. In position 91, pump pressure flows from pump 96 to port 99 of cylinder 59 causing piston rod 58 to extend, which in turn moves cam follower 55 downward until it engages cam 52. Any further movement of piston rod 58 will force rod 56 to retract against spring 103, which will shift valve 57 back to its neutral position 90 causing piston rod 58 to stop moving and the system to come to rest.

If cam 52 is moved to the right, as indicated by arrow 108, follower 55 is forced upward causing valve 57 to shift to its position 92, which allows pump pressure to flow to the rod end of cylinder 59 and retract piston rod 58. As rod 58 retracts, follower 55 also retracts until spring 103 can shift valve 57 back to its neutral position 90. Since valve 57 is attached to cable 61, any vertical movement A1 (FIG. 6) of cam follower 54 will cause a similar movement B1 of cable 61.

In the aforementioned manner, any movement of cam 52 will cause the cam follower to automatically traverse the contours dictated by the cam's surface and move the cable accordingly. It would also be possible for the present invention to operate without power steering whereby the cam followers 55 and 54 would be tied directly to cables 61 and 71.

Figure 8:
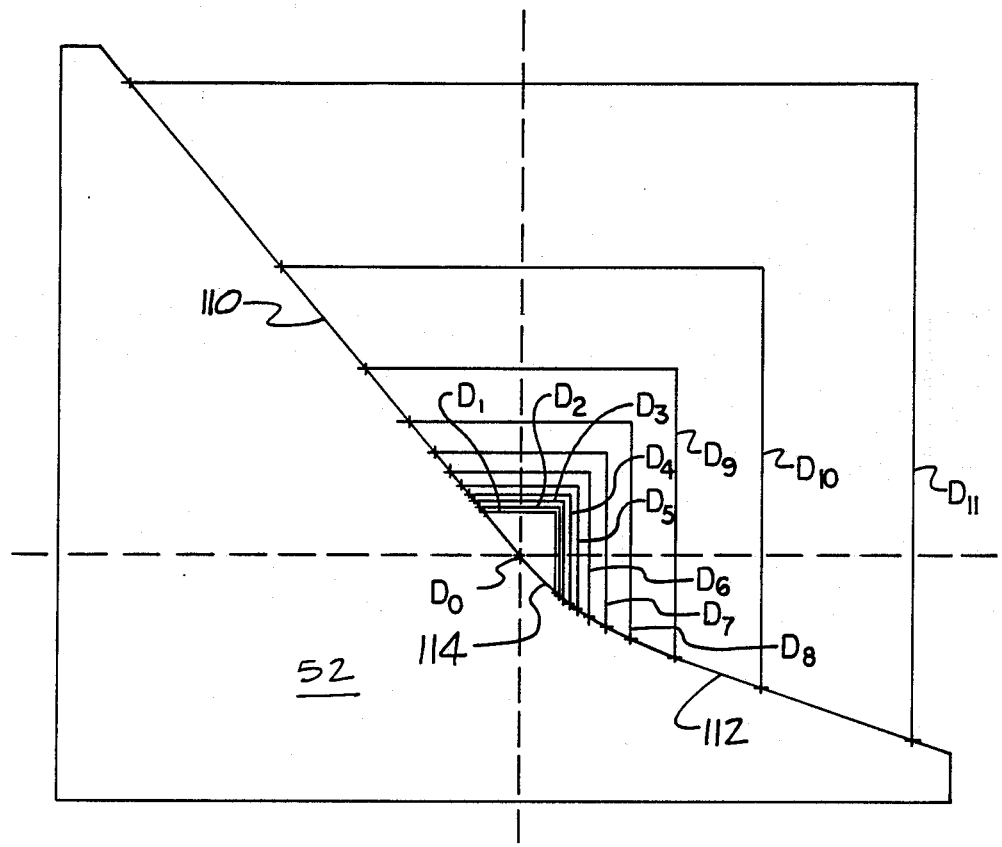
FIG. 8 is a detailed drawing of the cam of this invention.

FIG. 8 represents a cam having the proper configuration to accomodate the steering described in this invention. The cam has approximately a 70 degree slope in the upper portion 110 of the cam, with respect to horizontal and a 40 degree slope in the lower portion 112 of the cam, as illustrated. A gradual curve 114 joins the two slpes in between. The cam is developed by the lines illustrated as D1, D2, D3, D4, D5, D6 and D7 etc., wherein each point on the upper portion 110 corresponds with an angular position of the wheels on the inside of the turn while the points on the lower portion 112 of the cam correspond to the angular position of the wheels on the outside of the turn. The wheels on the inside of the turn obviously turn through a greater angle, as illustrated in FIG. 6. Therefore the slope of the cam must be steeper for the inside turning wheels than the outside wheels and the slope difference between 110 and 112 depends on the width of the vehicle or lateral spacing of the wheels. Thus point DO represents the location of the cam follower for straight ahead travel of the vehicle and is equivalent to the position L1 and L2 shown in FIG. 5. Each representative distance D1, D2, D3, etc., through D11 represent points closer to the sharpest turning radius that the vehicle can make. Thus, D11 represents the sharpest radius that the vehicle can turn; while D1 represents the radius slightly less than infinity. Each point from D11 through D1 represents equal increments on transverse line 113 (FIG. 6) taken from the farthest determined distance to the sharpest radius desired to be turned by the vehicle. While vehicle rotation point P1 (FIG. 6) is a very sharp or short turning radius. The turning radius could be even less. In other words, point P1 could be moved to the center of the vehicle, if desired, with the wheels turning through angles to the right of the left of more than 90°.

The grass three cutting heads 50 are conventional in design and arranged in an overlapping pattern extending laterally approximately to the edge of the wheels. The heads 50 are located slightly ahead of line 113 (FIG. 6) so the operator may steer in a normal manner to move closer or away from an obstruction with 4-wheel type steering.

Alternate embodiments for cam configurations are illustrated in FIGS. 9 and 10. In FIG. 9, steering column 17 rotates cams 51a and 51a, with cam follower 54 following cam 51a. Cam follower 55 is behind cam 54 and cannot be seen. In all other respects the apparatus of FIG. 9 functions identical to that of the appartus described previously.

In FIG. 10, the cams are separated with cam 51b having cam follower 54 in contact therewith and cam 52b having cam follower 55 in contact therewith. Steering column 17 drives a chain sprocket 106 which is coupled through a chain 107 to sprockets 108 and 109, respectively. Each of sprokets 108 and 109 drive cams 51b and 52b in identical manner to that shown in FIG. 9, with cam followers 54 and 55 functioning exactly as they are described in the previous figures.

The cam follower has been illustrated with a single cam surface. It is obvious that the cam can be made from a plate with a cam cut as a slot in the plate, so that the cam follower can fit into the slot and thereby not require a spring to maintain the cam follower in contact with the cam surface since the cam follower will be trapped by the slot. It is also obvious that other cam configurations can be utilized with or without power steering and still be well within the spirit and scope of this invention.

This invention basically describes a vehicle particularly useful for mowing grass and the like which has an unique method for maintaining the cutting heads close to the surface being cut regardless of the vertical position of the wheels as they traverse the surface of the earth. Furthermore, the invention describes an unique method for steering the vehicle so that it will maintain all wheel turning about a common point with no wheel scuffing, since each of the wheels will travel an individual circumference about the common point of rotation of the vehicle through substantial turning angles in excess of 90°.

It is obvious that other modifications can be made and still will be well within the spirit and scope of this invention as described in the specification and appended claims.

Having described the invention with sufficient clarity to enable those familiar with the art to construct and use it, we claim:

1. Apparatus for controlling the longitudinal direction of movement of a motorized vehicle comprising:
   (a) a frame means having a central frame and first and second side frames;
   (b) first and second pairs of wheels;
   (c) journal means mounting each of said wheels to said side frames and the side frames to the central frame for rotation of the side frames about a first axis parallel to a plane through said frame means; and the wheels about a second axis perpendicular to said plane;
   (d) first and second turning means coupled to said second axis of the journal means for rotating said first pair of wheels in opposite directions from each other, and said second pair of wheels in opposite directions from each other, respectively;
   (e) first and second cam means having first and second cam follower means resepectively;
   (f) steering means rotatably attached to said frame means and communicating with said cam means; and,
   (g) means for coupling said first and second cam follower means to said first and second turning means, respectively, said cam means being configured in a manner to cause said first and second pairs of wheels to follow a first and second circumference, both having a common center, when said steering wheel is turned, said common center lies upon a transverse line passing approximately through the center of the vehicle.

2. Apparatus as claimed in claim 1, wherein said first and second cam means are slidably secured to said frame means for movement together and in a linear direction normal to said turning means to effect a desired turn about said common center.

3. Apparatus as claimed in claim 1, wherein said first and second turning means each comprises first and second pulleys attached to said journal mounting means second axis, cable means passing around said second pulley means in opposite direction to said first pulley means and means for coupling said cam follower means to said cable means.

4. Apparatus as claimed in claim 3, wherein said means for coupling said cam follower means to said cable comprises:
   (a) a hydraulic actuator having an actuator shaft and housing, with means coupling said actuator shaft to said cable and said housing to said frame means;
   (b) valve means having an input arm connected to said cam follower means; and,
   (d) means responsive to said valve means for moving said actuator shaft in direction and distance in correspondence with said movement of said cam follower means against said cam means.

5. Apparatus as claimed in claim 4, wherein said cam means is configured so that said cam follower means moves said first and second cable means a linear distance to maintain each of said first and second pairs of wheels normal to a radius from said common center when said turning means is rotated from a position where all of said wheels are parallel with each other.

6. Apparatus as claimed in claim 1, including one or more grass cutting heads attached to the underside of the central frame in front of said traverse line on which said common centers are located, so that the vehicle will steer in a normal manner.

7. Apparatus as claimed in claim 1, wherein each cam means includes an upper portion for turning the pair of wheels on the inside of the turn at a shorter radius and a lower portion for turning the pair of wheels on the ouside of the turn at a longer radius.

8. Apparatus for controlling the longitudinal direction of movement of a motorized vehicle comprising:
   (a) a frame;
   (b) first and second pairs of wheels;
   (c) journal means mounting each of said wheels to said frame for rotation about a separate vertical axis;
   (d) first and second turning means coupled to the journal means, the first turning means rotating said first pair of wheels in opposite directions from each other, and the said turning means rotating said second pair of wheel in opposite direction from each other, respectively;
   (e) first and second cam means attached to the frame;
   (f) steering means rotatably attached to said frame and to said cam means; and,
   (g) means for coupling said first and second cam means to said first and second turning means, respectively, said cam means being configured in a manner to cause said first and second pairs of wheels to turn at a different rate so as to follow a first and second circumference for each pair, both having a common center, when said steering wheel is turned.

9. Apparatus as claimed in claim 8, wherein said first and second cam means are slidably secured to said central frame for movement together and in a linear direction normal to said turning means to effect a desired turn about said common center.

10. Apparatus as claimed in claim 8, wherein said first and second turning means each comprises first and second pulleys attached to said journal means, cable means passing around said second pulley means in the opposite direction to said first pulley means, the first and second cam means having first and second cam follower means and means for coupling said cam follower means to said cable means.

11. Apparatus as claimed in claim 10, wherein said means for coupling said cam follower means to said cable comprises:
   (a) a hydraulic actuator having an actuator shaft and housing, with means coupling said actuator shaft to said cable and said housing to said frame means;
   (b) valve means having an input arm connected to said cam follower means; and,
   (c) means respective to said valve means for moving said actuator shaft in direction and distance in correspondence with said movement of said cam follower means against said cam means.

12. Apparatus as claimed in claim 11, wherein said cam means is configured so that said cam follower means moves said first and second cable means by a distance to maintain each of said first and second pairs of wheels normal to a radius from said common center when said turning means is rotated from a position where all of said wheels are parallel with each other.

13. Apparatus as claimed in claim 8, wherein the turning means and journal means allow the two pair of wheels to rotate about their respective vertical axis up to ninety degrees (90°) to the right or left.

* * * * *